United States Patent [19]
Huck et al.

[11] Patent Number: 5,493,667
[45] Date of Patent: Feb. 20, 1996

[54] APPARATUS AND METHOD FOR AN INSTRUCTION CACHE LOCKING SCHEME

[75] Inventors: Scott B. Huck, Beaverton; Konrad K. Lai, Aloha; Sunil R. Shenoy, Portland; Larry O. Smith, Beaverton, all of Oreg.

[73] Assignee: Intel Corporation, Santa Clara, Calif.

[21] Appl. No.: 15,541

[22] Filed: Feb. 9, 1993

[51] Int. Cl.$^6$ .................................................. G06F 12/12
[52] U.S. Cl. ........................... 395/452; 395/455; 395/463; 364/DIG. 1; 364/243.41; 364/246.12
[58] Field of Search .................................. 395/400, 425, 395/403, 444, 445, 450, 452, 463, 479, 487, 455, 460, 461

[56] References Cited

U.S. PATENT DOCUMENTS

| | | | |
|---|---|---|---|
| 4,513,367 | 4/1985 | Chan et al. | 395/425 |
| 5,019,971 | 5/1991 | Lefskey et al. | 395/250 |
| 5,043,885 | 8/1991 | Robinson | 395/425 |
| 5,249,286 | 9/1993 | Alpert et al. | 395/425 |
| 5,283,876 | 2/1994 | Tague | 395/400 |

Primary Examiner—Eddie F. Chan
Assistant Examiner—Hiep T. Nguyen
Attorney, Agent, or Firm—Blakely, Sokoloff, Taylor & Zafman

[57] ABSTRACT

An instruction locking apparatus and method for a cache memory allowing execution time predictability and high speed performance. The present invention implements a cache locking scheme in a two set associative instruction cache that utilizes a specially designed Least Recently Used (LRU) unit to effectively lock a first portion of the instruction cache to allow high speed and predictable execution time for time critical program code sections residing in the first portion while leaving another portion of the instruction cache free to operate as an instruction cache for other, non-critical, code sections. The present invention provides the above features in a system that is virtually transparent to the program code and does not require a variety of complex or specialized instructions or address coding methods. The present invention is flexible in that the two set associative instruction cache is transformed into what may be thought of as a static RAM in cache, and in addition, a direct map cache unit. Several different time critical code sections may be loaded and locked into the cache at different times.

67 Claims, 7 Drawing Sheets

PRIOR ART FIGURE 2

APPARATUS AND METHOD FOR AN INSTRUCTION CACHE LOCKING SCHEME

BACKGROUND OF THE INVENTION

(1) Field of the Invention

The present invention relates to the field of memory accessing technology for the storage and retrieval of data and/or instructions from a memory unit. Specifically, the present invention relates to the field of memory cache technology employed to increase the speed and execution time predictability of instruction code processing or data processing.

(2) Prior Art

Among the many elements of a computer system are found a central processing unit (CPU), memory storage units (which may be RAM or ROM or otherwise), and interface and control logic units that couple the CPU to the memory storage units for accessing and processing of data and instructions. Generally, each time the CPU processes an instruction it must access a memory storage unit to gain desired data for processing or to obtain the execution instructions themselves, the opcodes, which reside in memory. The CPU is constantly interfacing with the memory storage units. Recent developments in computer technology have offered a variety of different types of memory storage units which are adapted for different functions and have different characteristics. Specifically, use of a cache memory unit and associated logic has become extremely popular because of the versatility, efficiency, and high speed accessing offered by the cache memory. Cache memories that store data used in a program are called data cache memory and cache memories that store program instructions, opcodes, are called instruction cache memories.

Opcodes or Instructions as Data

Machine code (assembly code) is the program code that a microprocessor interprets and processes directly. Each instruction of a program executed by a microprocessor is represented as data within a computer memory and is called instruction data. In order to execute a program, the microprocessor must read the memory to access the program steps or microcode instructions. These instructions are processed on a sequential basis and therefore the memory unit is generally accessed in such a way. The below syntax is an example of instruction data and program data:

LOAD C, 08H.

The above instructs the microprocessor to load the value of 08H into a register called "C." The instruction, LOAD, to load register C, will have an associated numeric value which represents the load instruction and this value must be stored in memory. This value is called instruction data because it is data that represents the instruction. For sake of illustration, assume that the microprocessor instruction for loading register "C" with an immediate value is decoded into the value, 068H. In memory, the value of 068H is stored and is called instruction data. The value 08H is called program data because it is the data that will be loaded into register "C," but it does not represent an instruction. In memory, this value is located adjacent to the associated instruction data. Each value has an associated address of memory. The below illustrates how these values might be stored in a typical computer memory.

| Address | Data |
|---------|------|
| 0001    | 068H |
| 0002    | 08H  |

Where address 0001 holds the instruction data for the load instruction, 068H, while address 0002 contains the program data for the value to be loaded into the register, 08H.

An Instruction Cache

The instruction cache is typically a small sized and specially designed memory unit designed for high speed access to the CPU of a microprocessor in order to provide the microprocessor with some program instructions. Typically, the instruction cache is of limited size because of the constraints of interfacing the cache in the same chip as the CPU; a typical instruction cache may be 1/100th the size of the main (external) memory unit. The cache memory is designed to specially interface with the CPU so that the CPU can access the instructions stored in the cache at very high speeds verses the relative long instruction accessing time required of other, external, memory units. Many cache units are located structurally within the chip containing the microprocessor unit for high speed accessing.

An instruction cache is filled with the addresses and instruction data of the instructions that the CPU will probably execute on a routine or cyclic basis. These instructions are placed into the cache memory from the external memory (or generated by the CPU and placed into the cache memory) typically during the execution of a program. That is, the most recently processed instructions, determined by monitoring the instruction flow executed by the CPU, are placed into the instruction cache memory. New instructions are placed or replaced into the instruction cache and tagged for identification while older instructions (i.e., sections of the program code not accessed over a given time period) are slowly "aged out" or removed from the instruction cache. The instructions placed within the cache are also tagged with a unique identifier that is related to the effective memory address associated with the instruction of the external memory unit.

Cache operations function on the theory that many computer programs frequently utilize a relatively small percentage of program code on a cyclic basis and those commonly used instructions will end up located within the high speed cache memory providing efficient access. During program execution when the CPU desires to execute program code stored in memory, a special cache logic unit which is part of the cache first scans the contents of the instruction cache memory unit to determine if the desired address is located within the high speed instruction cache. If so, the instructions are accessed via the instruction cache utilizing the tag identifier and the position of the instruction data within the cache. In this case external memory access is not required to execute this program code and therefore the delay associated with external memory access is avoided. Each time instructions are accessed via the instruction cache a significant amount of time is saved by avoiding the delay associated with the external memory access. In the event that the desired instructions are not within the data cache, an instruction cache logic unit will indicate that a "cache miss" has occurred associated with the access instruction. When a cache miss occurs, the desired data must be accessed from, or to, the external memory which is usually not associated with the structural location of the cache memory unit. This accessing of the external memory takes longer than a cache memory access.

A prior art cache system is illustrated in the block diagram of FIG. 1.0. The external memory unit 60 is illustrated coupled to interface control unit 14 which provides controlled access to the external memory 60. A high speed limited size instruction cache unit 10 is illustrated coupled to the logic unit 14. The high speed cache unit is coupled to a microprocessor instruction fetch unit 50 via a cache control unit 12 which controls accessing to the cache between microprocessor instructions and determines whether or not the requested microprocessor instructions reside in the cache. The instruction cache memory 10 may be associated within the cache logic unit 12. The microprocessor instruction fetch unit 50, the logic unit 12 and the high speed cache 10 are all located within the chip of the microprocessor 5. Because of this location, and other special characteristics, the instruction cache memory 10 allows high speed, efficient interface to the microprocessor.

When the microprocessor requests to execute an instruction, the address of the instruction is first examined to determine if the instruction may be accessed via the instruction cache 10 by comparing the address of the instruction to the tags of the cache memory 10. If the instruction is available from instruction cache 10, then the cache 10 will rapidly supply the program instruction and no external memory access to memory 60 is required. If the program instruction is not found within the instruction cache 10 then a cache miss will be generated and the instruction is fetched through the external memory 60. When the requested instruction is obtained via the logic unit 14, it is forwarded to the microprocessor instruction processing unit for execution. The fetched instruction is also placed into the instruction cache 10 and tagged to be made available for subsequent use. Each time an instruction can be accessed from the cache, only a small amount of time is expended for the instruction access. On the other hand, each time an instruction must be accessed via the external memory 60, a large access delay is encountered which decreases overall processing speed and efficiency.

The Need for Predictability

It should be noted from the above discussions that the exact accessing location of a particular instruction (i.e., within cache or external memory) is not always known because the instruction cache 10 is updated on a real-time basis with the most recently used instructions stored in the cache and others aged out and replaced according to the cache logic. Using such a cache system, a programmer at the time the code is developed will not know the exact memory unit from which particular instructions will be accessed. Since each accessing location has different associated delays (i.e., cache accessing is very rapid while external memory accessing is very slow) a programmer will not know the exact execution time for any particular code segment. The execution time will depend on the time the microprocessor takes to execute the instruction (which is generally known) plus the time the system expends to access the required instructions and associated data from memory (which depends on whether the cache memory or the external memory is accessed).

There are instances when a particular section of program code must execute within some given timing window. For instance, assuming an embedded microprocessor is implemented within a laser printer. Certain update routines that create an image for printing must operate within a given high speed timing window in order to keep up with specialized printing and imaging hardware. In these applications, the programmer must be assured that critical program code sections that generate the print image fully execute within the given high speed time constraint. Given the unpredictable nature of the contents of the instruction cache, the prior art systems will not assure that critical program code sections fully execute within a predictable timing window. What is needed is a cache system that provides high speed and predictable execution time of critical program code sections while allowing other sections of the program code to operate normally with the instruction cache. The present invention offers such capability.

One prior art system implemented to provide execution time predictability shuts down the instruction cache completely during program execution. By shutting down the instruction cache, all processed instruction must be accessed via the external memory and therefore the accessing time is known for all instructions. However, this prior art system suffers from poor processor performance because the instruction cache is disabled and external memory is used for all accessing. Such poor performance is not desirable in most microprocessor applications. Further, many applications require that the time critical code sections operate as rapidly as possible. This prior art system of disabling the instruction cache will not satisfy applications requiring high speed execution of the critical code sections. What is needed is a system that offers high speed execution time as well as predictability of the critical program code sections. The present invention offers such capability.

Another prior art system for providing execution time predictability is illustrated in FIG. 2. FIG. 2 illustrates an instruction cache unit 10 that is separated into two different sections. Section 21 is the top section and contains cache entries 1 to 10 while section 22 is the bottom section containing cache entries 11 to 20. This prior art system offers execution time predictability by placing those sections of the program that require time critical processing into section 21 while section 22 can be utilized for other caching operations. Critical program code is loaded into the upper section 21 of the instruction cache 10 and the other section 22 remains available for other caching purposes. In effect, this prior art system creates two caches, one for time critical portions and one for the other program sections.

In operation this prior art system of FIG. 2 is disadvantageous because the program code must specify which instruction cache (21 or 22) is to be used for each program code section to be executed. If the cache portion is not specifically identified and indicated by the programmer, the time critical section in the cache can be overwritten. The bookkeeping required to track each time critical section versus the non-time critical sections is complex. Special instructions must be developed in order to differentiate between the two cache sections 21 or 22 used with each program code section. Each instruction address also must be specially identified (coded) to include the proper cache section associated with that instruction. Each time a time critical section is entered or exited, the programmer must employ special instructions to direct proper use of either cache section 21 and cache section 22. Also, if a mistake in programming is made and the wrong cache section is associated with the time critical code, the result is that processing performance will be severely degraded because each executed instruction will generate a cache miss because the wrong cache is being referenced.

What is needed is a system that offers high speed execution as well as execution time predictability that is also transparent and easy to use for a programmer. That is, what is needed is a system that is very straightforward to utilize for a programmer and that does not require a programmer to indicate and specify each cache location for particular critical and noncritical program code routines. What is needed is a system like the above that can be implemented without overly costly modifications to existing instruction cache systems. The present invention offers such capability.

Accordingly, it is an object of the present invention to provide a method and apparatus for providing an instruction cache locking scheme. A further object of the present invention is to provide execution time predictability of time critical routines at the highest possible execution time in order to increase processing speed and efficiency. Another object of the present invention is to provide the above in a system that is generally transparent to the program code and that does not require a variety of additional or complex instructions or address codes. Another object of the present invention is to provide instruction cache flexibility by allowing certain portions of the instruction cache to provide caching operations for time critical program routines while allowing other portions of the instruction cache to process other program sections. It is an object of the present invention to implement the advantages of the above instruction cache locking scheme without overly complex and advanced circuits so that the instruction cache locking scheme can be implemented in existing caching systems without undue expense or modification. It is appreciated that other objects of the present invention not specifically enumerated herein will become apparent in discussions to follow.

SUMMARY OF THE INVENTION

The present invention incudes an instruction cache locking apparatus and method that advantageously provides an advanced and specialized LRU pointer unit to effectively temporarily lock into the cache memory a particular set of cache entries that contain time critical instructions while allowing the remainder of the cache memory to operate unlocked. The present invention includes an instruction cache apparatus for supplying and storing instructions to a microprocessor, the instruction cache apparatus includes: cache memory means for providing storage of the instructions, the cache memory means comprising a plurality of sets, each set of the plurality of sets comprising a plurality of entries; pointing means for indicating a particular entry of the plurality of entries for each set, the particular entry being a least recently utilized entry of the plurality of entries for each set; processing means for updating the pointing means, the processing means coupled to the pointing means; and blocking means for preventing the processing means from updating the pointing means such that the pointing means never indicates that instructions within a first portion of the cache memory means are least recently utilized while said blocking means is asserted.

The present invention further includes the apparatus as described above and storage means for storing an instruction into the cache memory means at a particular set of the plurality of sets, the storage means for reading the pointing means to determine the least recently utilized entry of the plurality of entries of the particular set and for storing the instruction into the least recently utilized entry.

The present invention further includes the apparatus as described above and wherein the first portion of the cache memory that is blocked by the blocking means is that portion of the cache memory means that was most recently utilized by the microprocessor before the blocking means was asserted.

The present invention further includes the apparatus as described above and further includes means for loading a particular plurality of instructions into the cache memory means when the blocking means is not asserted, the particular plurality of instructions loaded into the first portion of the cache memory means; and means for asserting the blocking means after the particular plurality of instructions have been loaded into said cache memory.

DETAILED DESCRIPTION OF THE INVENTION

Figure 1:
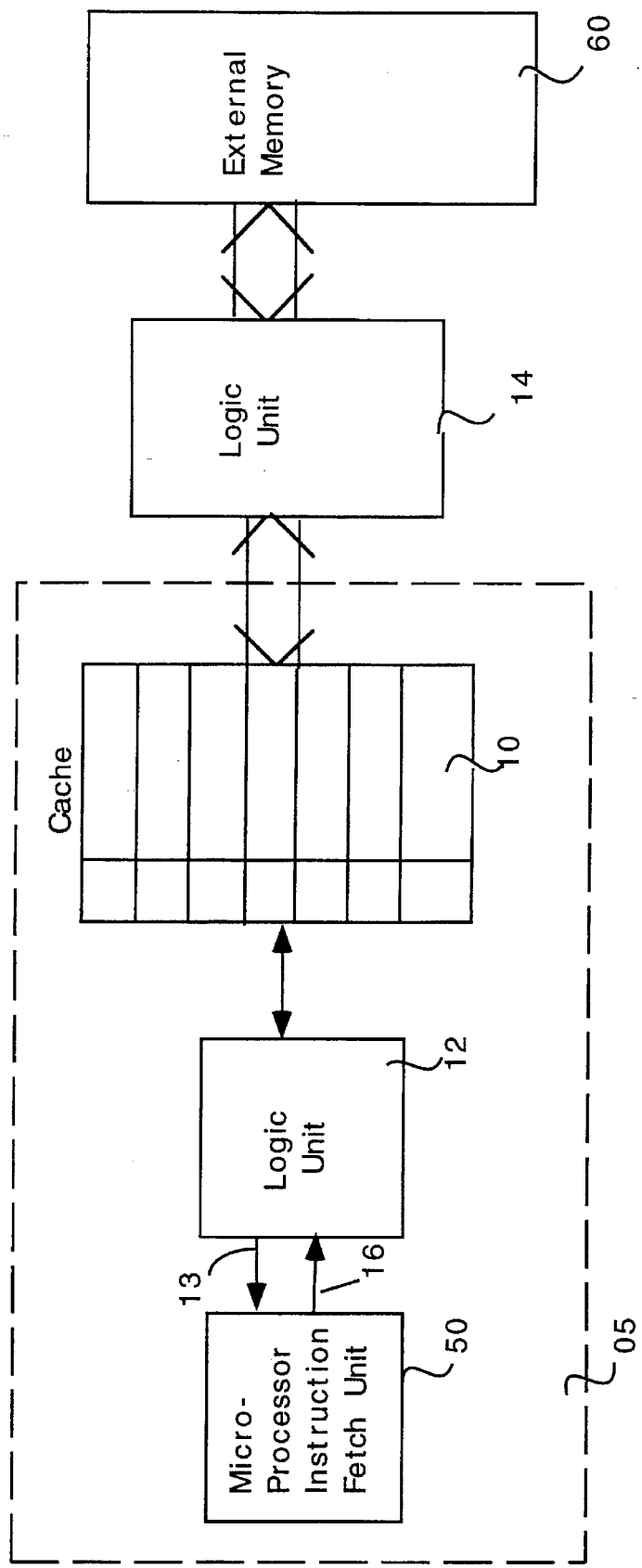
FIG. 1 is an illustration of a prior art cache memory implementation.
Figure 2:
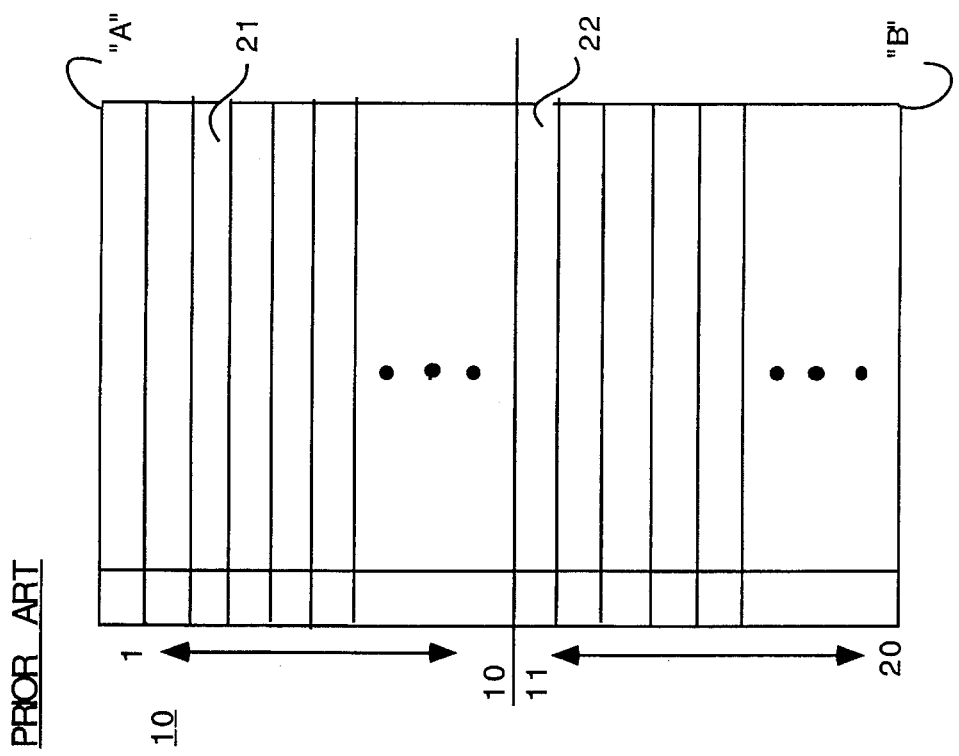
FIG. 2 is an illustration of a prior art instruction cache scheme.

The present invention includes an apparatus and method for efficiently blocking certain portions of an instruction cache so that critical program routines may execute directly from cache and are prevented from aging out of the instruction cache according to the advantageous apparatus of the present invention. Further, portions of the instruction cache not containing the critical program code may operate normally as an instruction cache. In the preferred embodiment of the present invention, the instruction cache utilized is a two way set associative cache memory and after implementation of the preferred embodiment of the present invention, this cache may be logically described as: 1) a two way set associative (direct map) instruction cache; with 2) a static RAM in cache which contains the critical program routine for execution.

The present invention is partially implemented within the Least Recently Used (LRU) unit of the instruction cache unit and modifications thereto provide some of the advantageous cache blocking features of the present invention. The present invention is extraordinarily flexible in that at any time, the instruction cache may be unlocked to allow the entire instruction cache to operate normally as a conventional instruction cache or sections of the cache memory may be logically locked for execution of time critical program code. Further, the present invention allows for flexibility in that different time critical program routines may be loaded into locked sections of the instruction cache at different times without specialized programming instructions or procedures; to this extent the present invention operates in a way that is virtually transparent to the computer programmer or user.

In the following detailed description of the present invention numerous specific details are set forth in order to provide a thorough understanding of the present invention. However, it will be obvious to one skilled in the art that the present invention may be practiced without these specific details. In other instances well known methods have not been described in detail as not to unnecessarily obscure the present invention.

Overall System and Environment of the Present Invention:

The overall system and environment in which the preferred embodiment of the present invention operates is first described. In general, computer systems used by the preferred embodiment of the present invention, as illustrated in block diagram format in FIG. 3, comprise an external bus 100 for communicating information to and from the components of the overall system, a central processor 101 coupled with the bus 100 for processing information and instructions, an external memory 60 coupled with the bus 100 for storing information and instructions for the central processor 101, a read only memory (not shown but may be part of the external memory 60) coupled with the bus 100 for storing static information and instructions for the processor 101, a random access memory (not shown but may be part of the external memory 60) coupled with the bus 100 for storing dynamic information and instructions for the processor 101, a data storage device 104 such as a magnetic or optical disk and disk drive coupled with the bus 100 for storing information and instructions, a display device 105 coupled to the bus 100 for displaying information to the computer user, an alphanumeric input device 106 including alphanumeric and function keys coupled to the bus 100 for communicating information and command selections to the central processor 101, a cursor control device 107 coupled to the bus for communicating user input information and command selections to the central processor 101, and a signal generating device 108 coupled to the bus 100 for communicating command selections to and from the processor 101.

It should be noted that some systems of the present invention may contain all or merely a portion of the above components. For example, if the present invention was implemented within a control device for an advanced laser printer, the input device would be a keyboard at the copier console or a signal input for the laser printer. The display would be the common LCD display of the laser printer to the user or an LED indicator light. Of course, RAM and ROM devices (within external memory 60) are present within most systems. The signal generation device 108 would include the logic required to detect and indicate printer malfunctions, or communication ports on the printer. It is also appreciated that throughout this discussion, reference may be made to data in a memory or the processing of data; it should be understood that the term "data" means both data that may be processed by an instruction as well as the data that represents the instruction itself, i.e., the bytes that comprise a particular opcode. Therefore, data should be construed as representing program data as well as representing program instructions.

Figure 3:
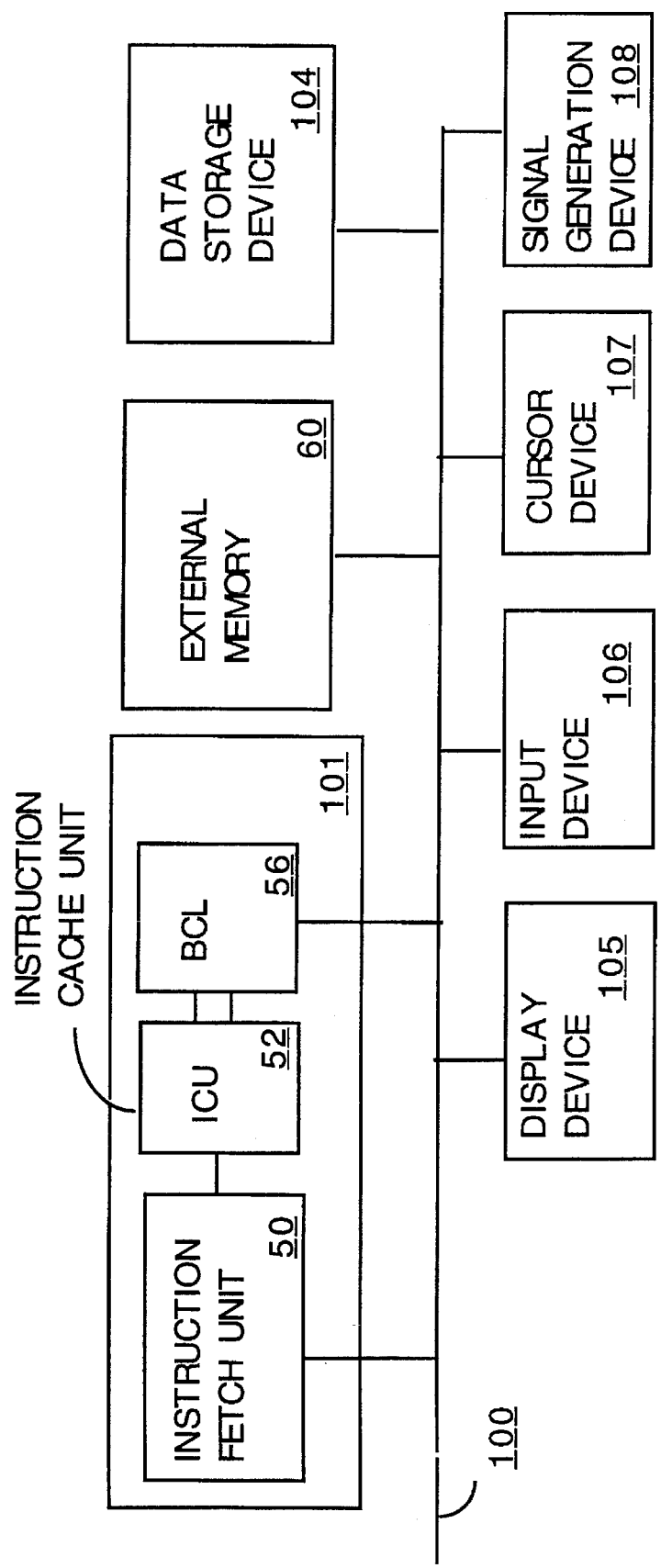
FIG. 3 is an illustration of the system components of the present invention.

Referring still to FIG. 3, the display device 105 utilized with the computer system and the present invention may be a liquid crystal device, cathode ray tube, a simple LED indicator light, or other display device suitable for creating graphic images and alphanumeric characters recognizable to the user. The cursor control device 107 allows the computer user to dynamically signal the two dimensional movement of a visible symbol (pointer) on a display screen of the display device 105. Many implementations of the cursor control device are known in the art including a trackball, mouse, joystick or special keys on the alphanumeric input device 105 capable of signaling movement of a given direction or manner of displacement. It is to be appreciated that the cursor means 107 also may be directed and/or activated via input from the keyboard using special keys and key sequence commands. Implementations of the present invention may not include a cursor device.

FIG. 3 illustrates the preferred embodiment of the present invention which locates an instruction cache logic unit 52 within the chip containing the microprocessor 101. As shown also within microprocessor 101 is an instruction fetch unit 50 of the microprocessor and a bus interface unit 56 for communication between the microprocessor elements and the external bus 100. The instruction fetch unit 50 of the microprocessor performs the well known functions of obtaining the microprocessor instructions from memory for execution by the microprocessor's instruction processor unit (not shown). This fetch unit 50 is coupled to the instruction cache unit (ICU) 52 and also coupled to the bus 100. External memory 60 is shown interfaced with the bus 100. External memory 60 may be composed of RAM or ROM or both. This memory 60 is "external" in so far as it is external to the microprocessor unit 101 and "off chip." The bus control unit 56 is coupled to the external bus 100 and to the instruction cache unit 52.

Figure 4:
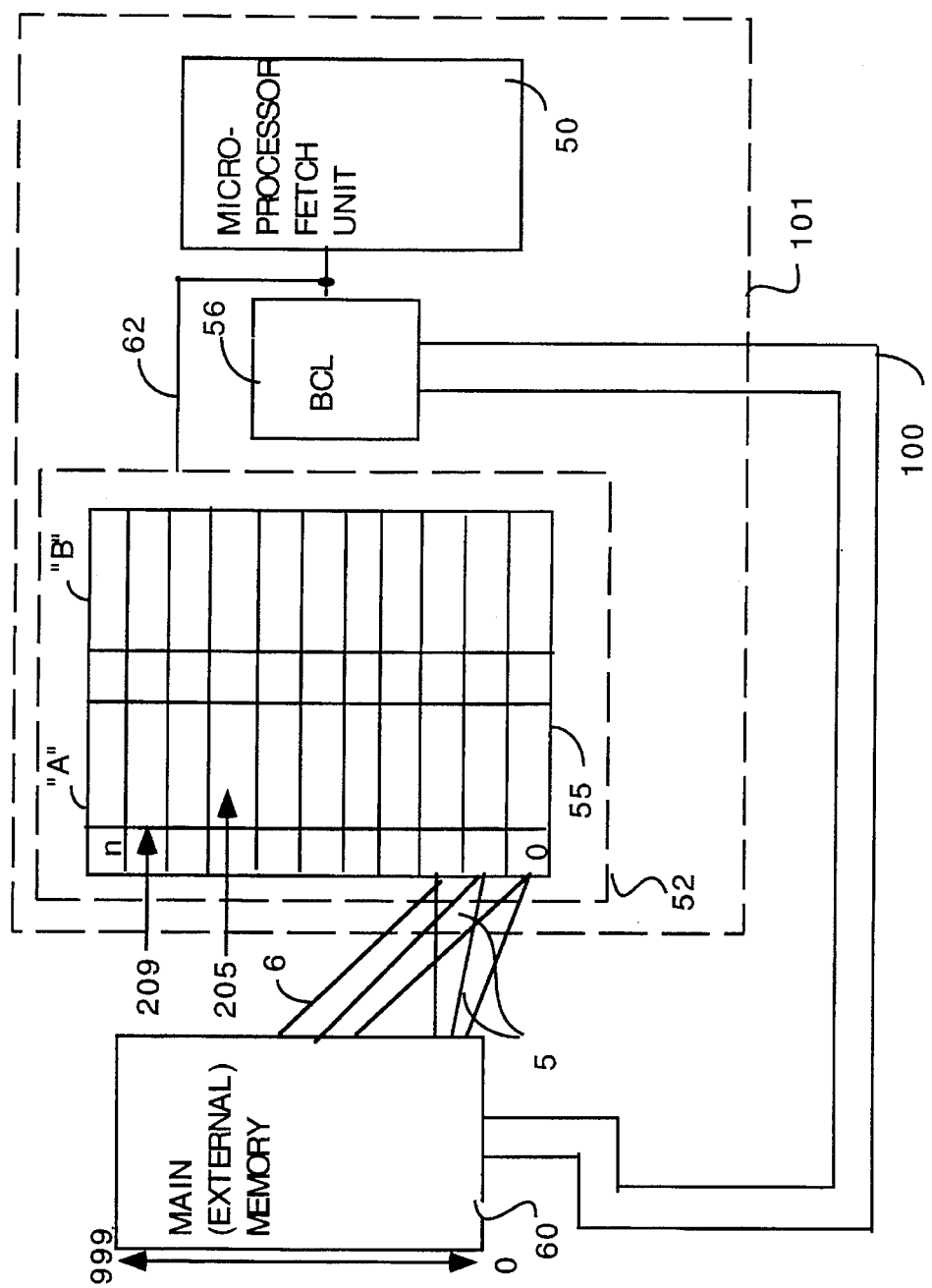
FIG. 4 is a block diagram of elements of the present invention.

Refer to FIG. 4 which illustrates a more detailed diagram of elements of the microprocessor 101. The present invention utilizes a two way set associative cache memory array 55; way A and way B are illustrated in FIG. 4 associated with instruction memory 55. The cache memory 55 is divided into two columns called "ways" and ten rows called "sets." Each cell of the cache of the present invention is called an entry and is composed of a tag and instruction data. For any given set (0–9) instructions are stored into the cache 55 in only one way, "A" or "B,[ at any given time. That is, each cache set contains a pointer that points either to way A or to way B for each set. Depending on the character of this pointer, data associated with an address that is directed to a particular set will be directed to an entry either in way A or in way B. This will be discussed further below.

Memory mapping from the main memory 60 into the cache memory 55 is done in a predetermined order. Certain address sections of main memory 60 may map into predetermined locations (sets) within the cache memory 55. It is noted that the present invention may operate with external memory units 60 and instruction cache memory units 55 of a variety of sizes. Memory sizes discussed herein are shown for the sake of illustration only and should not be considered restrictive of the present invention. As shown logically for illustration, main memory 60 is divided into 1000 address locations (addresses 0 to 999). The instruction cache memory 55 illustrated is composed of two ways of 10 sets per way yielding 20 entries total. Each entry contains a tag field 209 and a data field 205. As with conventional cache operations, the tag field represents the lower order bits of an address in main memory and the data field represents the data of that address which represents a particular instruction for execution. The most significant bits of the address location are represented by the location of the set of the entry within the cache memory array 55. Since there are two ways of memory ("A" and "B") within the instruction cache 55, there are twenty possible entries in the cache to hold and reference twenty possible address locations.

FIG. 4 illustrates that first three addresses 5 of the main memory 60 may map into the first three sets of the instruction cache (sets 0 to 2). Also, middle three addresses 6 of the external memory 60 may map into the first three sets of the instruction cache 55 (sets 0 to 2). This is the case because the memory mapping from the external memory into the cache memory 55 of the present invention is accomplished in an interleave format; in this format every $n^{th}$ address in the main memory 60 may map into a single cache set given a cache memory of n sets. Therefore, several addresses within external memory 60 may map into the same set in the instruction cache memory 55. And with each set there are two ways (A or B). The microprocessor fetch unit determines which particular address is associated with a single cache entry by utilizing the tag field associated with that entry. Therefore, an address in the external memory is associated with a cache entry by using the tag field 209 in conjunction with the set number (0 to n) of the entry within the instruction cache; a particular cache set location only maps to a particular segment of the main memory 60. When the microprocessor executes an instruction that is not present within the cache memory 55, the instruction cache unit fills this new instruction into the cache memory 55 for possible subsequent usage. Although this form of instruction caching is well known in the art of computer cache technology, it is disclosed herein to provide a detailed and complete description of the elements of the present invention.

FIG. 4 illustrates other elements of the present invention. The external memory 60 is coupled to the microprocessor instruction fetch unit 50 via the external bus 100 and a bus control unit 56 which is coupled between the internal bus 62 and the external bus 100. An internal bus 62 couples the instruction fetch unit 50 to the instruction cache unit 52 which contains the instruction cache memory 55 and logic utilized to implement caching functions and procedures of the present invention. It is appreciated that the instruction cache memory 55 of the present invention is connected to the main memory via bus 100 and the bus control unit 56 so that data may be loaded into the instruction cache 55 from the main memory 60 when requested. A bus control unit 56 is just one method of implementing such communication and associated control.

Figure 5:
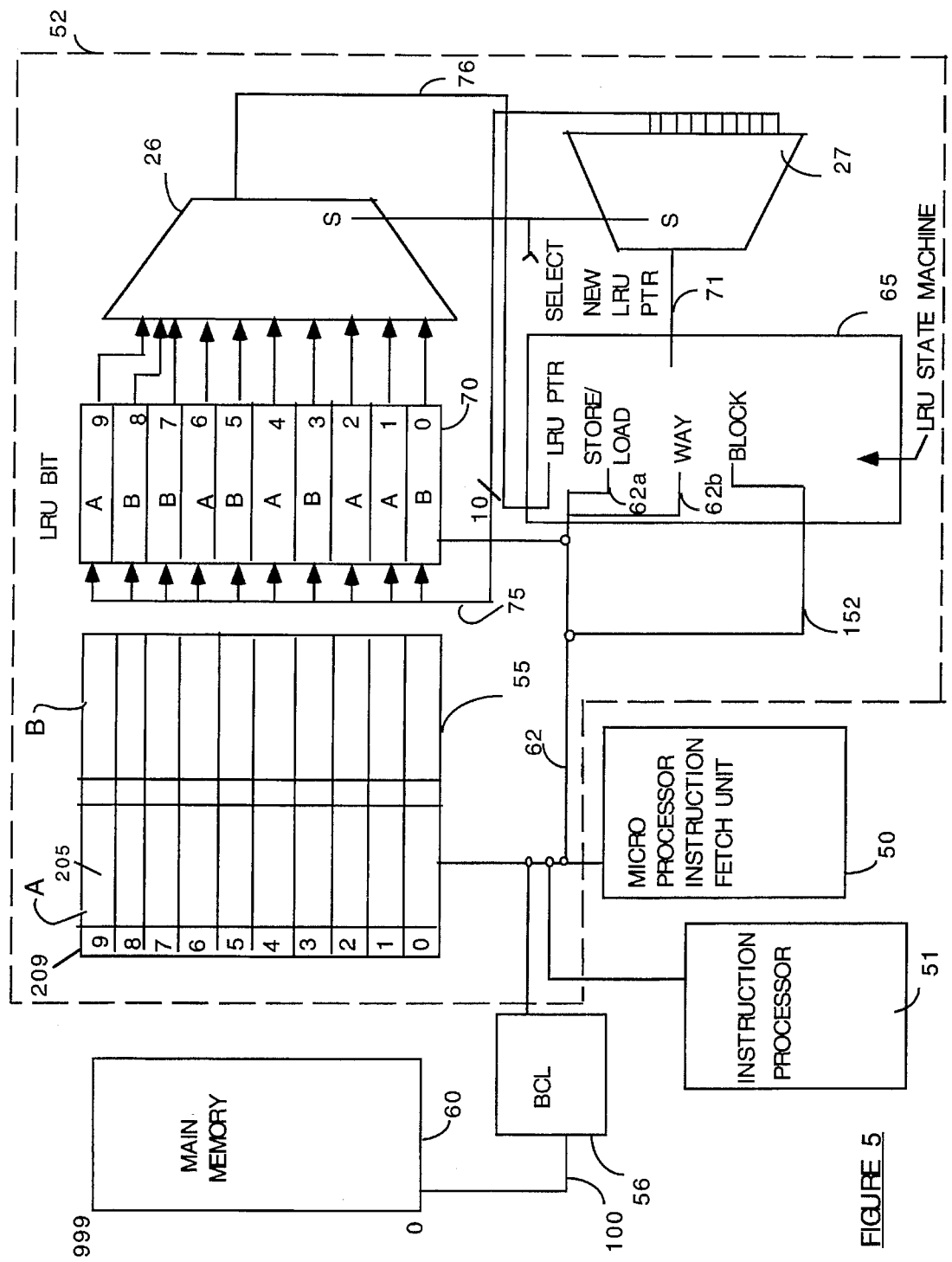
FIG. 5 is a block diagram of the preferred embodiment of the present invention utilizing a two way set associative instruction cache.

Refer to FIG. 5 which illustrates the components of the instruction cache unit 52 of the preferred embodiment of the present invention in more detail. FIG. 5 illustrates main memory 60 which is external to the microprocessor chip 101. The remainder of the components shown in FIG. 5 are located within the microprocessor chip 101. A Bus Control Unit 56 is shown coupled to the external bus 100 and also coupled to an internal bus 62. The BCL 56 controls communication between the microprocessor 101 and the external bus 100. Instruction data that goes to and from the external memory 60 will traverse through the BCL 56. Also residing within microprocessor 101 is an instruction processor 51 that executes and decodes instructions for processing; instruction processor 51 is coupled to the internal bus 62. A microprocessor instruction fetch unit 50 is also shown coupled to the internal bus 62. The instruction fetch unit 50 is responsible for obtaining ("fetching") the current instruction from memory for execution by the instruction processor 51. Within the instruction cache unit 52 a two way set associative cache memory 55, an LRU bit table 70 and an LRU state machine 65 are coupled to an internal bus 62. It is appreciated that the BCU 56 may be located off chip (i.e., separate from the microprocessor chip 101) in one implementation of the present invention. In the present invention, the instruction cache unit 52 is located within the microprocessor 101. FIG. 5 illustrates only 10 sets of the instruction cache 55 for clarity. It is appreciated that a variety of cache sizes may be implemented within the scope of the present invention.

As discussed, the instruction cache unit 52 contains the instruction cache memory 55, an LRU pointer table 70 (implemented in memory logic) and an LRU state machine 65 and other logic required to perform caching control between the microprocessor and the instruction cache unit; some of this logic is not illustrated in detail in order to not unnecessarily obscure the present invention. The above elements are coupled together via an internal bus 62. In the preferred embodiment of the present invention, the LRU pointer table 70 and LRU state machine are located in the cache directory section of the instruction cache unit 52. As discussed previously, memory addressess of the external memory 60 are mapped into particular sets (0–9) within the cache memory 55. There are two ways (A and B) for each set.

LRU Pointer Table 70

The present invention partially blocks a selected portion of the instruction cache memory by preventing an LRU pointer table from pointing into that selected portion. The LRU pointer table 70 determines which particular way (A or B) of a given set will receive any new instruction data from the external memory 60 that is destined for a particular set. The way pointed to by the LRU table indicates the way that is the least recently accessed way of the set by the microprocessor. The LRU pointer table 70 contains an entry for every set of the instruction cache unit 55. Each entry (0 to 9) of the LRU pointer table 70 of the present invention is a single bit that either points to way A or way B of a set of the instruction cache memory 55. The LRU pointer table points to the way (A or B) within the memory cache 55 that is the least recently utilized way for each set. The least recently utilized way within a given set will be the selected way in which new instruction cache data will be stored because this is the oldest entry within the set. In other words, the present invention ages out instructions within the instruction cache by utilizing the LRU table 70 and storing new instruction data into the least recently used way of a particular set.

Each time a set within the instruction cache memory 55 is accessed by the instruction cache unit 52 for instruction data retrieval or storage, the LRU entry of table 70 associated with that set is first read by the instruction cache unit (ICU) 52 to determine which way (A or B) to use as an entry to store the instruction data. The entry selected for storage will be associated with that way (A or B) that was least recently utilized within the set as indicated by LRU bit table 70 (say way B). Once instruction data in that particular entry associated with that particular way (say B) is accessed (i.e., stored or retrieved) by the microprocessor, that way will no longer be the least recently utilized, and the LRU bit table 70 will point to another way (way A). The logic required to update and query the LRU bit table 70 is the LRU state machine 65 of the present invention which is coupled to the LRU bit table 70 via an internal bus 62 and multiplexers 26 and 27. It should be noted that bits of the LRU table are also updated upon instruction loading from the instruction cache to the microprocessor. It is appreciated that the logic circuits required for storing instruction data from the external memory into the cache memory 55 reside within the instruction cache unit 52 and are well known. Any well known technique for instruction cache storage may be employed consistent with the scope of the present invention. It is appreciated that these circuits that perform the functions of instruction data storage into the cache memory 55 have not been explained in detail in order to not unnecessarily obscure the present invention.

The present invention also generates a blocking signal on line 152 which is associated with the internal bus 62 which is coupled to the microprocessor instruction processor 51. Upon execution of a specialized instruction, the microprocessor instruction processor 51 asserts an active signal on line 152 which is fed to the LRU state machine 65. When the blocking signal on line 152 is no longer required and the cache memory 55 is requested to be unlocked, the microprocessor executes an unblocking instruction which disables the signal on line 152. This signal will be discussed more fully below.

The LRU bit table 70 as shown in FIG. 5 has an entry for each set of the cache memory 55, entries 0–9 are shown. Each entry is a single bit register that holds either a "1" or a "0" and will thus point to way A or way B depending on the bit contents. An example of the contents of the LRU bit table 70 is shown in FIG. 5. For example, entry 5 in the LRU table is pointing to way B of set 5 of the cache memory and way B is the oldest entry of set 5. The next time an address from the main memory is accessed that corresponds to set 5 of the cache memory, the instruction data associated with that address will be placed into way B since way B is the least recently used way of set 5. After the entry associated with way B is loaded with the new instruction data, the LRU bit will toggle and point to way A, under control of the LRU state machine 65. The next time an address associated with set 5 is accessed from main memory 60, the new instruction data will be placed into an entry in way A of set 5 and the LRU bit will toggle back to way B (via the LRU state machine 65). Or, the next time the microprocessor instruction processor 51 reads the data from way A of set 5 of the cache 55, the pointer of the table 70 associated with entry 5 will toggle to way B and vice-versa. However, if the LRU points to way A and data is accessed by the microprocessor from way B then the LRU will remain pointing to way A and no updating will occur. Using this method, the bits of the LRU bit table 70 always point to the entry of a particular set (0 to 9) associated with the way that is the least recently used ("accessed") way by the microprocessor. In theory, this will be the least recently used entry by the microprocessor and should therefore be replaced by more current data.

Given the above, the LRU bit table 70 of the present invention is updated when: (1) an instruction is accessed from a cache set to the microprocessor ("a load operation"); and (2) when an instruction is loaded into a cache set from the cache unit ("a store operation"). In the first case for a given set, if the LRU table 70 points to A and way A is accessed by the microprocessor then the LRU table toggles to B. If the LRU table 70 points to A and way B is accessed by the microprocessor then the LRU table remains pointing to A and will not toggle. In the second case, the LRU table will always toggle upon loading of a new instruction into the cache memory because loading occurs in the LRU pointed way and therefore the LRU table must be updated. It can be seen for a given set, upon a store operation the LRU will always toggle the pointer. For a load operation the LRU pointer will take the inverse value of the current way accessed, which may or may not toggle the pointer depending on the state of the pointer before the load operation.

The LRU state machine 65 includes specialized toggle logic. Each time (1) a set of the cache memory 55 is accessed by the microprocessor to retrieve an instruction stored in the way indicated by the LRU pointer for that set or (2) each time a set of the cache memory 55 is accessed for storage, the bit in the LRU bit table 70 associated with that set is coupled to a multiplexer 26 and output to LRU state machine 65. The bit is fed into the state machine 65 which may nor may not toggle the bit value and the output of state machine 65 is then fed back into the LRU bit table 70 at the entry associated with the current set via multiplexer 27. If the current cache instruction is a load operation from the cache (cache hit) and the microprocessor is loading an instruction stored in a way not pointed to by the LRU table 70, then no toggling occurs since the LRU already points to the least recently utilized way. Line 62 indicates to the LRU state machine if the current operation is a load or a store operation and also which way and which set are implicated in the operation. If line 62 indicates a store operation then the state machine 65 will toggle the LRU pointer for that set implicated by the store. If line 62 indicates that the current operation is a load operation then the present LRU pointer associated with the implicated set only toggles if the way indicated over line 62 is equivalent to the present LRU pointer and will not toggle if the way indicated over line 62 is different from the present LRU pointer.

According to the preferred embodiment of the present invention, the LRU state machine is coupled to bus 62 which carries a bit over line 62a which indicates if the current operation is a microprocessor load or a microprocessor store operation with the cache memory. Also, line 62b indicates which way of the implicated set was accessed by the current operation. Line 152, the blocking signal, is also fed into the state machine 65. The state machine will output a signal over line 71 to indicate the new LRU pointer value for a given implicated set number according to the mapping values found in Table I. The implicated LRU entry number of the implicated set of the current operation is sequenced to the state machine according to multiplexers 26 and 27. Multiplexer 26 routes the pointer to the state machine 65 while multiplexer 27 routes the newly computed pointer value back. The output of multiplexer 26 is coupled to line 76 which is the current LRU pointer value. The select lines of multiplexer 26 are programmed by the current set number (0–9) to select the proper register bit as an input for the current operation. A second multiplexer 27 is utilized by the present invention in order to store the output 71 of the state machine 65 back into the associated bit register of table 70. The outputs of multiplexer 27 are coupled to the inputs of the LRU bit table 70 via line 75. Again, the select lines of this multiplexer 27 are programmed by the current set number (0–9) as shown.

It is appreciated that a variety of implementations can be utilized in order to perform the functions of the state machine 65. FIG. 5 and Table I illustrate just one LRU update implementation of the present invention. The state machine 65 can be implemented according to the mapping of Table I, one such implementation may be according to a PAL or PROM design. It is appreciated that Table I implements the following functions. If the operation is a store into the cache (i.e., a cache miss) then the LRU will be toggled if the blocking signal is not asserted. If the operation is a load from the cache and the cache generates a hit in one way but the other way is the LRU indicated way, then LRU will not toggle. If the operation is a load from the cache and the cache generates a hit in one way and the LRU is the same way, then the LRU pointer must be toggled.

TABLE I

| Input | | | | Output | |
| --- | --- | --- | --- | --- | --- |
| Store=1/ Load=0 62a | LRU Ptr 76 | Way 62b | Block 152 | New LRU 71 | |
| 1 | 0 | 0 | 0 | 1 | (toggle) |
| 1 | 1 | 1 | 0 | 0 | (toggle) |
| 1 | 0 | 0 | 1 | 0 | (no toggle) |
| 1 | 1 | 1 | 1 | 1 | (no toggle) |
| 0 | 0 | 0 | 0 | 1 | (toggle) |
| 0 | 1 | 1 | 0 | 0 | (toggle) |
| 0 | 1 | 0 | 0 | 1 | (no toggle) |
| 0 | 0 | 1 | 0 | 0 | (no toggle) |
| 0 | 0 | 0 | 1 | 0 | (no toggle) |
| 0 | 1 | 1 | 1 | 1 | (no toggle) |

TABLE I-continued

| Input | | | | Output | |
|---|---|---|---|---|---|
| Store=1/ Load=0 62a | LRU Ptr 76 | Way 62b | Block 152 | New LRU 71 | |
| 0 | 1 | 0 | 1 | 1 | (no toggle) |
| 0 | 0 | 1 | 1 | 0 | (no toggle) |

The present invention of FIG. 5 will determine which cache set of a given operation is implicated. This set value will be fed to the selection lines of multiplexers 26 and 27. Next, the present invention will assert line 62a if the instruction was a store (cache miss) or not assert line 62a is a load (cache hit) instruction and this line is fed into state machine 65. Signal 152 is fed to the state machine 65. Line 62b indicates the way that is selected by the current operation for load or store. Multiplexer 26 feeds the current value of the LRU pointer for the selected set. State machine 65 determines the value of the new LRU pointer and this value is fed over line 71 to multiplexer 27 back to the LRU table 70 into the selected set number entry.

Blocking Signal of the Present Invention:

As discussed before, the microprocessor instruction processor 51 of FIG. 5 generates a blocking signal 152 when a predetermined instruction is executed and disables the signal 152 when an unblocking instruction is similarly executed. This signal 152 is coupled to the LRU state machine 65 to disable its toggle function; when toggling is disabled, the state machine will output the same LRU pointer value as was input thus maintaining the LRU table pointers. When the disable pin is asserted, the bits of the LRU table 70 will not toggle when data is stored into the sets of the cache memory 55. Since the bits of the table 70 do not toggle, while signal 152 is asserted the same way (A or B) will continually be replaced by the new instruction data as was last pointed to by the table 70 before the signal 152 was asserted. This will effectively freeze the data associated with the other way not pointed to by the LRU bit table 70 for the duration of the signal 152.

Cache Miss with Blocking Signal Asserted

For instance for a cache miss, assume that the LRU bit table pointed to way B for set 3. Assume that the disable signal 152 was then asserted by the microprocessor instruction processor 51. The next time that instruction data was stored into set 3 of the cache memory, the instruction cache unit 52 would read the LRU bit (entry pointer 3) associated with set 3 and determine that way B is the least recently utilized entry. The instruction cache unit 52 would then store the first instruction data gathered from the external memory 60, via the BCL 56, into the entry in way B. Next, the LRU state machine would attempt to toggle the pointer bit associated with set 3 in the LRU bit table 70. However, since the disable signal was asserted, the pointer bit for set 3 will not toggle. If a subsequent second instruction data was sent to the cache for set 3 it would then be again placed into the entry for way B even though way B was just previously loaded with the first instruction.

Cache Hit with Blocking Signal Asserted

For a cache hit, assume that the LRU bit table pointed to way B for set 3. Assume that the disable signal 152 was then asserted by the microprocessor instruction processor 51. The next time that instruction data was accessed from set 3 of the cache memory by a cache hit, the instruction cache unit 52 would read the LRU bit (entry pointer 3) associated with set 3 and determine that way B is the least recently utilized entry. Next, the LRU state machine 65 would attempt to toggle the pointer bit associated with set 3 in the LRU bit table 70. However, since the disable signal 152 was asserted, the pointer bit for set 3 will not toggle. If a subsequent second instruction data was sent to the cache for set 3 it would then be again placed into the entry for way B even though way B was just previously accessed for retrieval of the first instruction.

According to both examples shown above, it is appreciated that instruction data in an entry associated with way A would remain frozen in the cache and perpetually remain available while signal 152 was asserted. Therefore, the present invention offers a mechanism to predict when time critical program code will be available within the cache memory 55. Time critical program code will be available within the cache memory 55 whenever it was just previously loaded into cache memory 55 and signal 152 remains asserted. Since the access time of the cache memory is known, the execution time of this time critical routine within the cache will be a known quantity.

In effect, the present invention would lock the instruction data of the entry at way A into the instruction cache as long as the disable line 152 was asserted. In fact, according to the preferred embodiment of the present invention, the most recently used entry of a set would be locked into the cache 55 while the disable signal 152 is asserted. In this fashion, a programmer utilizing the present invention may disable the 152 signal so that the invert function of the state machine 65 is enabled and operates to allow toggling, then load time critical program routines into the cache memory 55 which will cause the LRU state machine 65 to toggle the LRU bit for that set. Once the time critical program routines are loaded into cache memory 55, the disable line 152 is asserted to disable the invert function of the state machine 65 and prevent further toggling of the LRU bit table 70. This will effectively prevent the newly loaded time critical program routines from being replaced by the instruction cache unit. Therefore, a programmer would always know the exact location and execution time of this critical program code since no cache misses would be generated. It is appreciated that the remainder of the cache memory 55 that is not locked would remain available for normal instruction data caching operations.

Operational Flow of the Present Invention:

The present invention offers the ability to load certain program instructions into the instruction cache 55 and then lock them into the cache indefinitely by utilizing a specialized LRU state machine 65 and a blocking signal 152. Therefore, once locked into the cache, the location and execution time of these instructions will be predictable and also very short since every access to these instruction will yield a cache hit thus eliminating any external memory 60 accessing. In operation, the preferred embodiment of the present invention first loads time critical code into the cache memory, this may be accomplished by merely executing the instructions in a first or initial loop which will initially place these instructions into the least recently utilized entries of the cache memory 55 which then become the most recently used entries.

It should be noted that at the initial loading of the instructions of the time critical code, all of the instructions of a critical routine do not necessarily have to be associated with the same way. It may be that some of the instructions occupy way A and some way B of different sets; the order solely depends on the current state of the LRU table 70 just before the time critical code is initially executed and loaded into the sets. In any case, once the time critical code is initially executed by the microprocessor, a special instruction is issued by the microprocessor instruction processor 51 to assert the disable signal 152. This instruction may be as simple as setting a predetermined bit into a specialized LRU control register which asserts line 152, such methods are well known in the art of programming and microprocessor architecture. This disable instruction is executed after the initial execution of the time critical program code. When the time critical routine is fully completed, the microprocessor will then execute an unblock instruction with turns off the disable signal 152 to allow the cache to be fully unlocked (i.e., by resetting the LRU control register bit).

Once the disable instruction is executed, the LRU state machine 65 will no longer point the LRU bits of table 70 to the entries that currently hold the execution code instructions. These entries in the cache are effectively removed from the LRU state machine 65 LRU processing. These instructions are effectively frozen into the cache memory 55. Each time these critical instructions are requested by the instruction fetch unit 50 a cache hit will occur and the instructions will be executed from the instruction cache. The LRU pointer table 70 will utilize the remainder of the entries (i.e., those not containing the critical code) as a normal instruction cache and the entries of the LRU bit table 70 will solely point to these remaining cache entries and will not point to the cache entries containing the critical instructions while signal 152 is enabled.

Once the time critical instructions have completed execution, an instruction within the program code may be executed by the microprocessor 101 to disable signal 152. At this point, the time critical instructions residing within the locked portion of the instruction cache memory are unfrozen and may be pointed to by the LRU bit pointers in table 70. Then the LRU state machine is free to utilize these cache entries that contain the critical instructions in the LRU table 70. Or, alternatively, a new time critical program routine may be loaded into the instruction cache and signal 152 may be asserted once again.

Figure 6:
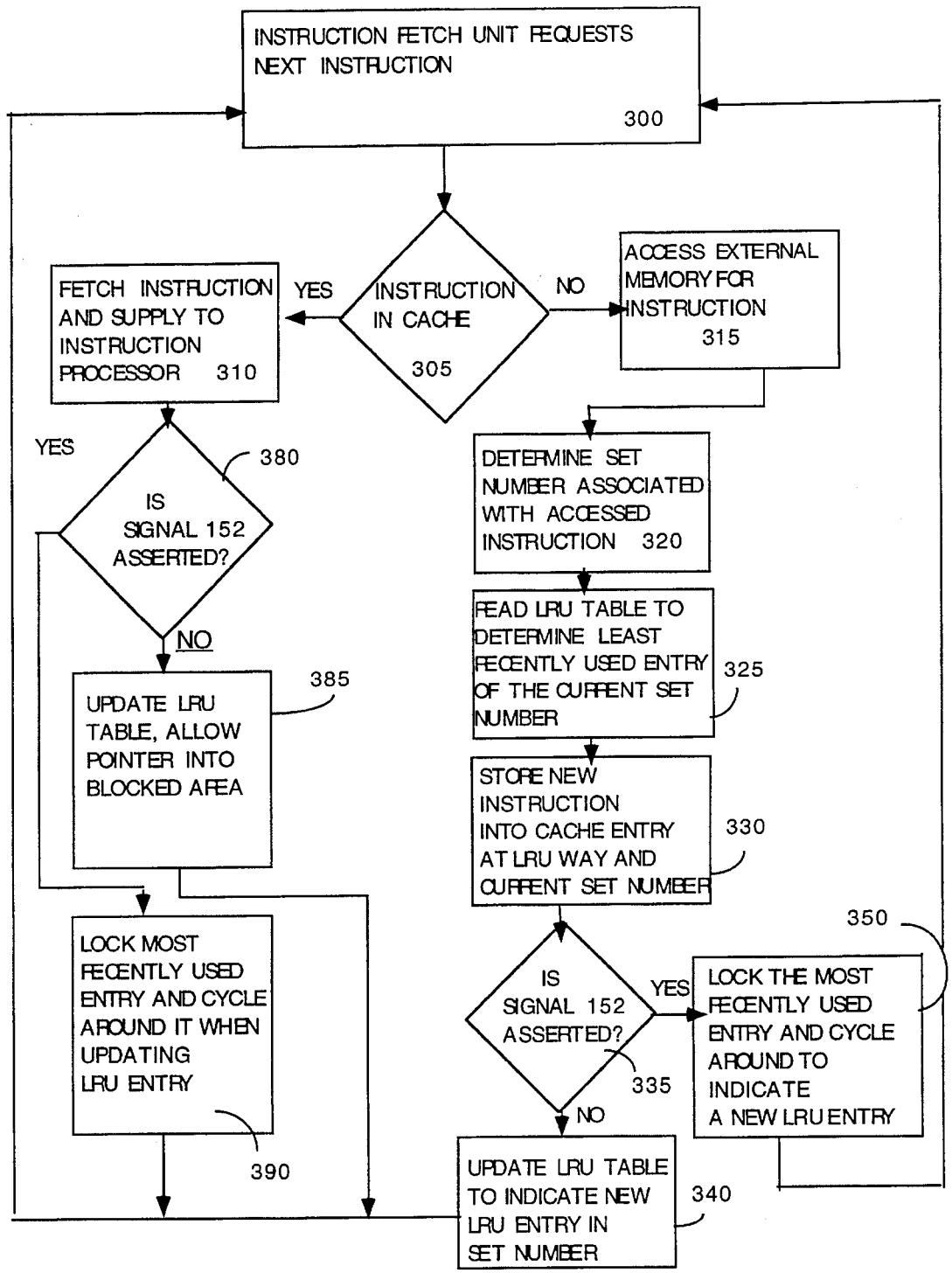
FIG. 6 is an operational flow diagram illustrating the major functions and processing tasks performed by the preferred embodiment of the present invention.

FIG. 6 illustrates an operational flow diagram of the major events of the preferred embodiment of the present invention. At block 300 the microprocessor fetch unit 50 requests that a next instruction be obtained for execution. At block 305, the instruction cache unit 52 checks the instruction cache memory 55 to determine if the requested instruction is within the cache memory 55 or not and will generate a cache hit or a cache miss. This is accomplished by comparing the effective memory address of the instruction against the tags stored in the instruction cache entries of a particular set to locate a match. If a match is found, then processing of the present invention continues to the cache hit block 310 where the instruction is loaded from cache memory 55 and delivered over the internal bus 62 to the instruction processor 51. At this point the LRU table 70 must be updated to reflect that a particular way of a particular set has been accessed since this action effects the ordering the LRU pointer.

Processing continues to block 380 where the present invention determines if signal 152 is asserted or not. If this signal is asserted then the LRU state machine 65, at block 390, will keep the cache locked in a previously locked state or will lock the most recently used entry if in the previous state the cache was not locked. The LRU state machine 65 will then update the LRU pointers of table 70 accordingly by excluding the locked way from the LRU processing by preventing any toggling of the LRU pointers. According to the preferred embodiment of the present invention, at this point the inversion function of the state machine is disabled and no toggling of the LRU bits of table 70 is thus permitted when signal 152 is asserted. Processing will then continue to block 300.

If signal 152 is not active at block 380 and there is a cache hit, then the present invention flows to block 385 and will update the LRU pointer table 70. If the current operation is a microprocessor load into way A and the LRU pointer indicates way A then the LRU pointer will toggle for the implicated set. If the current operation is a microprocessor load into way B and the LRU pointer indicates way B then the LRU pointer will toggle for the implicated set. If the current operation is a microprocessor load into way B and the LRU pointer indicates way A then the LRU pointer will not toggle for the implicated set. If the current operation is a microprocessor load into way A and the LRU pointer indicates way B then the LRU pointer will not toggle for the implicated set.

Processing then returns to block 300 to obtain a new instruction for processing. If the instruction is not in the instruction cache 55 at block 305 then processing continues to the cache miss block 315 where the external memory 60 is accessed for the address of the desired instruction. This flow is also executed by the present invention for a microprocessor store operation. At block 320, the present invention next determines which set number is associated with the address of the desired instruction that returns from the external memory access. At block 325 the present invention then reads the LRU table 70 to determine which way (A or B) is the least recently used of the determined set number. At block 330, if the bit corresponding to the current set number of the LRU table 70 points to way A then the current instruction will be stored in the entry corresponding to way A of the current set number. If the bit corresponding to the current set number of the LRU table 70 points to way B then the current instruction will be stored in the entry corresponding to way B of the current set number.

As discussed, signal 152 is not asserted by the microprocessor at the initial time the critical instructions are executed in order to first load these instructions into the instruction cache 55. At this point, the test at block 335 will fail. Therefore, the present invention will continue to block 340 where the bit of the LRU table 70 associated with the current set number will toggle to indicate the alternate way. If the instruction was stored in way A then the LRU state machine will toggle the bit to way B and vice-versa if the instruction was stored in way B. The toggling function is accomplished by reading the proper bit from the LRU bit table 70 by feeding the current set number into the select lines of multiplexer 26 which will feed the LRU bit into the input of state machine 65 via line 76. The output 71 of the state machine 65 will then be fed through multiplexer 27 and the inverted bit will be latched back into the bit register of the LRU bit table 70. At a predetermined period between block 315 and block 330, the requested instruction is also fed to the instruction processor 51.

Referring to FIG. 6, the present invention then proceeds to block 300 where the next instruction is fetched. The present invention continues the above looping until every instruction of the critical code section is initially executed. Once the critical code section is fully executed at least one time, an instruction is given by the microprocessor to assert signal 152 in order to lock this code section into a portion of the cache memory 55. While the signal 152 is asserted, the critical code will always be located in cache memory 55. Therefore, whenever the fetch unit 50 requests these addresses from the cache memory 55, the present invention will always generate a cache hit at block 305 and block 310 will rapidly provide the instruction to the fetch unit 50 without the requirement of an external memory delay. Processing will then return to block 300.

Upon a cache miss after the critical code is loaded into the cache memory 55, processing of the present invention will go to block 315 where external memory 60 is accessed for the desired instruction and then to block 320 where the set number of the miss address is determined. The present invention then proceeds to block 325 where the LRU table is read to determine the indicated LRU entry location of the new instruction and associated tag. At block 330, the new instruction is stored into the entry corresponding to the LRU bit of the LRU table 70 associated with the current set number. Processing of the present invention will then eventually reach block 335. This time signal 152 is asserted. At block 335, the present invention then responds to the assertion of signal 152. If signal 152 is asserted then the invert function of state machine 65 will be disabled and no toggling of the LRU bits will be done by the LRU state machine upon loading (at block 330) of the new instruction that generated the cache miss. Processing then proceeds to block 350 where the LRU state machine is prevented from toggling the LRU bit. The LRU bit cannot toggle because the entry corresponding to the critical code instructions has been locked and may not be overwritten by new instruction data. Therefore, even though an instruction is just loaded into an entry indicated by the LRU bit, that bit is not changed. The entry receiving the new instruction is then indicated as the least recently used entry, even though the new instruction was just loaded into that entry. Processing then continues to block 300 for a new instruction fetch cycle. In so doing, the instructions of the time critical program routine are locked into the cache memory 55 as long as signal 152 is asserted.

Alternative Embodiments of the Present Invention

Figure 7:
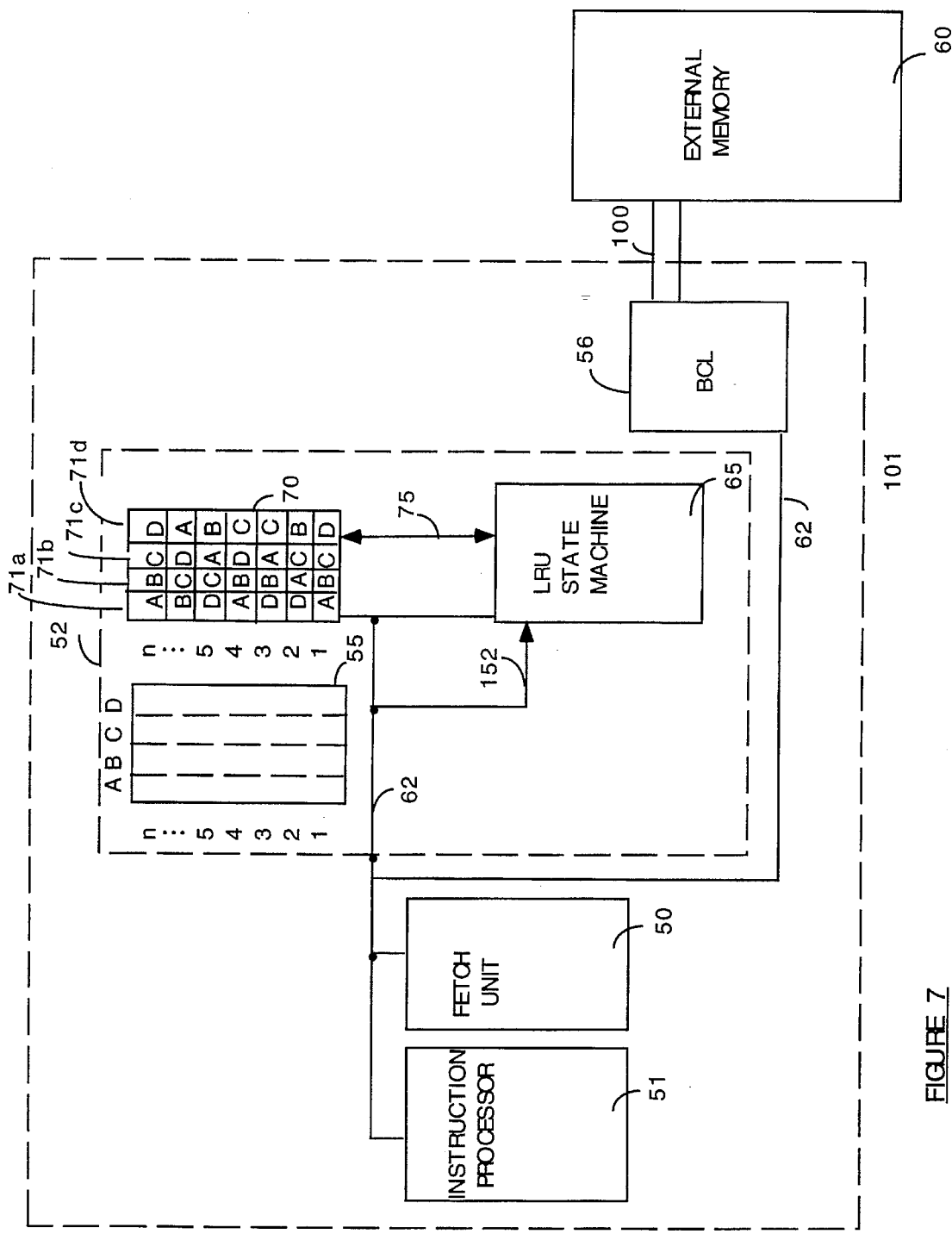
FIG. 7 is a block diagram of an alternate embodiment of the present invention utilizing a four way set associative instruction cache.

The above describes the preferred embodiment of the present invention implemented in a two way set associative cache memory. It is appreciated that other embodiments of the present invention exist that may utilize alternative cache memory configurations. For example, a three way set associative or a four way set associative cache may be implemented by the present invention. In the case of a three way set associative cache, the present invention may advantageously lock one of the ways of the cache, creating a static RAM in cache while leaving the other portion to act as a fully functional two way set associative cache. FIG. 7 illustrates an embodiment of the present invention that utilizes a four way set associative cache. The present invention may then advantageously lock any particular way or ways in the cache to become a functional static RAM in cache while leaving the remainder of the cache free to perform as a n-way set associative instruction cache. For illustration, FIG. 7 will be described in the context of utilizing the LRU table to lock one way of the cache (allowing the locked portion to act as a static RAM in cache) while leaving the other three ways to function as a three way set associative instruction cache.

Refer to FIG. 7 where an alternative embodiment of the present invention is illustrated. Within the microprocessor 101 is located the bus control unit 56 for communication between the microprocessor's internal bus 62 and the external bus 100. Microprocessor 101 also contains an instruction processor 51 and an instruction fetch unit 50 and also an instruction cache unit 52. The instruction processor 51 and the fetch unit 50 are coupled to the internal bus 62 as well as the instruction cache unit 52. Within the instruction cache unit 52 is a four way set associative cache memory 55 having 1 to n sets and four ways (enumerated as ways A, B, C, and D) coupled to the internal bus 62. An LRU state machine 65 is also coupled to the internal bus 62 and is located within the instruction cache unit 52. A blocking signal 152 of the internal bus 62 is coupled to the LRU state machine 65. The LRU state machine 65 is coupled to a LRU pointer table 70 via interface 75. The LRU table 70 is located within the instruction cache unit 52.

This embodiment of the present invention utilizes a four column by n row pointer table 70 to indicate which way (A, B, C or D) of a particular set (1 to n) of cache memory 55 will be replaced upon instruction data storage into the cache memory 55. Entries into the pointer table 70 are arranged according to set (1 to n) which corresponds to the associated set of the cache memory 55. There are four columns 71a, 71b, 71c, and 71d for each entry of the pointer table 70. For any given set, the entries in column 71a (the left-most column) will point to the way of the cache memory 55 that is the LRU way (last recently used) and therefore points to the way that is the oldest way and is to be replaced next. The LRU state machine 65 is responsible for 1) placing recently accessed entries to the right-most column while 2) rotating left the entries of the each set of the table 70 that are not accessed upon each data access of the cache 55. Since the right-most column 71d represents the most recently utilized way of a particular set, it will be locked upon signal 152 assertion and the other table entries will update around the locked column 71d.

In other words, assuming the entry at set 1 of table 70 reads the following order at shown in FIG. 7: ABCD. As pointed to by column 71a, the way A is indicated as the LRU way for set 1. New instruction data storage associated with set 1 of the cache memory 55 will be placed into set A since it is indicated as the least recently used. After placement into set A, the LRU state machine 65 will perform two functions. It will first place the indicator of way A at column 71d (the most recently used column pointer) and then rotate each other way indicator one to the left through the empty space left by the A indicator. The new arrangement of set 1 of LRU table 70 will thus read "BCDA" across columns 71a, 71b, 71c, and 71d respectively. Assuming that on a subsequent operation, set 1, way C is accessed (load or store) by the microprocessor instruction processor. Because way C was accessed by the microprocessor, the LRU state machine 65 must update the LRU pointer table to indicate that way C was updated. The LRU performs two functions. It first places indicator "C" at column 71d (the most recently used position) and then rotates left the other positions. The result at set 1 will change from "BCDA" to "BDAC." As can be seen column 71a points now to way B as the LRU way of set 1 and way C is the most recently used indicator. If new instruction data was sent to set 1, it would be stored in way B and entry 1 in table 70 would read "DACB." It is appreciated that the above operation applies to all sets (1 to n) of cache 55.

According to the advantageous aspect of the present invention, when signal 152 is asserted, the entries corresponding to the most recently used way (stored at column 71d) of each set will be locked into cache 55 and therefore will be excluded from the rotation processing performed by the LRU state machine 65. This is done so that the LRU state machine 65 never places these cache entries as LRU entries because these entries hold the time critical instructions of the program code. For instance, assume time critical instruction were loaded into the cache 55 and the signal 152 was applied to the state machine 65 and further that the pointer table held the results as shown in FIG. 7. Column 71d holds the locked entries. Therefore, the time critical program codes are stored in the following ways across sets 1 to n: "DBCCBAD." As the critical program code was executed, these ways would be sequentially accessed via the cache 55 in this order. As indicated before, the instruction codes do not have to exist within the same way, the positions of the instruction code merely are a function of the configuration of the table 70 when the initial program code is executed and loaded into the instruction cache.

Assume now that the order of set 1 of table 70 is "ABCD" across columns 71a, 71b, 72c, and 71d. Assume also that signal 152 is not asserted and that a time critical instruction is then loaded by the instruction cache unit 52 into set 1 way A (since way A was the LRU way as indicated by column 71a). After the load, the LRU state machine will perform the following LRU processing functions: 1) place indicator A into column 71d then; 2) rotate the other entries left so the result is "BCDA" in column 71d. Assuming signal 152 is then asserted by the microprocessor instruction processor 51, the LRU state machine 65 will then lock indicator A into column 71d and column 71c now becomes the most recently utilized column for LRU processing. The LRU state machine 65 of the present invention will then only rotate left through columns 71a, 71b, and 71c while excluding column 71d from rotation upon further accessing. This is done so that way A is never pointed to as the LRU way by table 70. If instruction data is then to be stored into set 1, the LRU state machine 65 performs three LRU processing functions: 1) it locks way A into column 71d; 2) it will place way B (the current LRU way) into column 71c (now the most recent column); and 3) it will rotate the remainder of the entries left by one. The result will be the following order in set 1 of table 70 "CDBA." This indicates that way C is now the least recently used way. Note that the indicator for way A did not update because signal 152 was asserted.

The basic theory of operation for the LRU state machine 65 of the present invention as shown above, is to exclude the most recently used column 71d from LRU update processing upon activation of the 152 signal. This is done because according to the present invention, signal 152 is activated after the first execution pass of the time critical program code. After this first execution, the entries of the pointer table 70 will indicate that the cache entries holding the time critical program code, in column 71d, are the most recently used cache entries. The LRU state machine 65 will then exclude these entries from the LRU processing so that they never become replaced so long as signal 152 is asserted. The remainder columns of the LRU table 70 may then be used as a three way set associative cache memory since the LRU state machine 65 processes this portion of the instruction cache.

The LRU state machine 65 employed by this embodiment of the present invention may be implemented via a digital state machine having a specialized bit shifter that can perform the above functions on the digital data of the pointer table 70 on a row by row basis. When the instruction cache unit 52 determines which set is accessed, the data for that set is loaded into the LRU state machine 65. The LRU state machine 65 is coupled to the internal bus 62 in order to determine which way is being accessed currently by the microprocessor in order to determine which indicator (A, B, C or D) to place as the most recently used and then will shift the other indicators left. Once signal 152 is asserted the basic operation of the above is followed, but column 71c is used as the most recently used entry while column 71d is excluded from LRU processing. The other columns 71a and 71b are then left shifted upon microprocessor accessing. After the LRU processing by the LRU state machine 65, the pointer data is then loaded back into the particular set of the table 70. It is appreciated that a variety of logic units may be employed to implement these processing functions of the LRU state machine as described above. Any such method that performs the above functions are included within the scope of the present invention. What is important is that the LRU state machine never allow the table 70 to point to the entries of the cache 55 that hold the time critical program code when signal 152 is asserted. At the same time, the LRU state machine must treat the remainder of the cache entries as a normal three way set associative instruction cache. In this fashion, the time critical program code will never become aged out of the cache memory 55.

It is appreciated that according to this embodiment of the present invention, if the microprocessor accesses (via load or store operations) the instruction held within column 71d while line 152 is asserted, no action is taken by the LRU state machine and table 70 is not updated.

Employing the above of FIG. 7, this embodiment of the present invention effectively converts a four way set associative cache into a three way set associative cache with one portion of the cache effectively converted into a static RAM in the instruction cache 55 for executing any time critical program code. It is appreciated that the above analysis and description could be easily extended to include dividing a four way set associative cache into a two way set associative cache with the other two ways effectively converted into a static RAM in cache 55. In this way, the LRU state machine 65 would function to lock the two most recently utilized ways (columns 71c and 71d) upon activation of signal 152. Such would be an alternative embodiment of the present invention.

The preferred embodiment of the present invention, a virtually transparent method and apparatus for locking a portion of an instruction cache to provide efficient and predictable execution of time critical program routines while allowing other portions of the instruction cache to operate unlocked as a normal instruction cache, is thus described. While the present invention has been described in particular embodiments, it should be appreciated that the present invention should not be construed as limited by such embodiments, but rather construed according to the below claims.

What is claimed is:

1. An instruction cache apparatus for use with a microprocessor that executes a plurality of microprocessor instructions, said instruction cache apparatus comprising:

cache memory means for storing microprocessor instructions;

means for determining which of said microprocessor instructions are those least recently accessed within said cache memory means, said means for determining coupled to said cache memory means; and means for selectively prohibiting said means for determining from indicating that selected microprocessor instructions stored within said memory cache means are least recently used by said microprocessor during assertion of a blocking signal to ensure that said selected microprocessor instructions are subsequently accessible in said cache memory means, said means for prohibiting coupled to said means for determining;

means for indicating which of said microprocessor instructions are those least recently used by said microprocessor, said means for indicating coupled to said means for determining.

2. An instruction cache apparatus as described in claim 1 wherein said cache memory means is a two way set associative cache memory comprising a plurality of sets and two ways associated with each set of said plurality of sets.

3. An instruction cache apparatus as described in claim 2 wherein:

said means for indicating which of said microprocessor instruction are those least recently used within said cache memory means comprises a bit for indicating which way of said two ways is least recently used by said microprocessor for each set of said plurality of sets of said cache memory means;

said means for determining comprises inverter means for inverting said bit of said means for indicting associated with a particular set when a microprocessor instruction is stored into said particular set of said cache memory means; and wherein said means for selectively prohibiting comprises a disable means for disabling said inverter means so that said means for indicating does not alter indication state upon storage of a microprocessor instruction into said cache memory means.

4. An instruction cache apparatus as described in claim 1 wherein:

said cache memory means is a two way set associative cache memory comprising a plurality of sets and two ways associated with each set of said plurality of sets; and wherein said means for indicating further comprises a bit for indicating which way of said two ways is least recently used by said microprocessor for each set of said plurality of sets of said cache memory means.

5. An instruction cache apparatus as described in claim 1 wherein said means for determining comprises:

updating means for updating said means for indicating upon storage of a microprocessor instruction into said cache memory means.

6. An instruction cache apparatus as described in claim 5 wherein said means for prohibiting comprises a disable means for disabling said updating means so that said means for indicating does not alter indication state upon storage of a microprocessor instruction into said cache memory means.

7. An instruction cache apparatus as described in claim 1 wherein:

said cache memory means is a two way set associative cache memory comprising a plurality of sets and two ways associated with each set of said plurality of sets; wherein said means for indicating which of said microprocessor instructions are those least recently stored within said cache memory means comprises a bit for indicating which way of said two ways is least recently used by said microprocessor for each set of said plurality of sets of said cache memory means; and wherein said means for determining comprises inverter means for inverting said bit of said means for indicating associated with a particular set when a microprocessor instruction is stored into said particular set of said cache memory means.

8. An instruction cache apparatus for supplying instructions to a microprocessor, said instruction cache apparatus comprising:

cache memory means for providing storage of said instructions, said cache memory means comprising a plurality of sets of storage locations, each set of said plurality of sets comprising a plurality of entries;

pointing means for indicating a particular entry of said plurality of entries for each of said sets, said particular entry being a least recently used entry of said plurality of entries for each of said sets;

processing means for updating said pointing means, said processing means coupled to said pointing means; and blocking means for preventing said processing means from updating said pointing means such that said pointing means never indicates that instructions within a first portion of said cache memory means are least recently used, said instructions being a particular plurality of user selected instructions.

9. An instruction cache apparatus as described in claim 8 further comprising:

storage means for storing an instruction into said cache memory means at a particular set of said plurality of sets, said storage means for reading said pointing means to determine said least recently used entry of said plurality of entries of said particular set and for storing said instruction into said least recently used entry.

10. An instruction cache apparatus as described in claim 9 wherein said processing means updates said pointing means upon storage of said instruction by said storage means into said particular set of said cache memory means.

11. An instruction cache apparatus as described in claim 10 wherein said processing means updates said pointing means by ordering each entry of each of said sets according to a last time each said entry was used for instruction storage by said storage means.

12. An instruction cache apparatus as described in claim 10 wherein said first portion of said cache memory means that is blocked by said blocking means is that portion of said cache memory means that was most recently used for instruction storage by said storage means just prior to assertion of said blocking means.

13. An instruction cache apparatus as described in claim 8 wherein said processing means updates said pointing means by ordering each entry of each of said sets according to a last time each said entry was accessed by said microprocessor.

14. An instruction cache apparatus as described in claim 8 wherein said first portion of said cache memory means that is blocked by said blocking means is that portion of said cache memory means that was most recently used by said microprocessor just prior to assertion of said blocking means.

15. An instruction cache apparatus as described in claim 8 further comprising:

means for storing said particular plurality of user selected instructions into said cache memory means when said blocking means is not asserted, said particular plurality of instructions being loaded into said first portion of said cache memory means; and means for asserting said blocking means after said particular plurality of instructions has been stored.

16. An instruction cache apparatus as described in claim 15 wherein said microprocessor executes said particular plurality of instructions when said blocking means is asserted so that said plurality of instructions is accessed via said cache memory means.

17. An instruction cache apparatus as described in claim 16 wherein said means for asserting said blocking means disables said blocking means after execution time of said plurality of instructions is no longer critical.

18. An instruction cache apparatus as described in claim 15 wherein said particular plurality of instructions comprises time critical instructions that must execute within a predetermined timing window.

19. An instruction cache apparatus as described in claim 15 wherein said means for asserting said blocking means comprises said microprocessor executing a blocking instruction.

20. An instruction cache apparatus as described in claim 15 wherein:

said cache memory means comprises a two way set associative memory;

said pointing means comprises a logical pointer table having a bit pointer for each set of said plurality of sets of said cache memory means;

said processing means comprises a logical inverter for inverting said bit pointer for each set of said plurality of sets of said cache memory means;

said blocking means comprises a logical signal that is coupled to said processing means to functionally disable said processing means upon assertion; and said means for asserting said blocking means comprises said microprocessor executing a blocking instruction.

21. An instruction cache apparatus as described in claim 8 wherein said cache memory means comprises a two way set associative memory.

22. An instruction cache apparatus as described in claim 8 wherein said pointing means comprises a logical pointer having a bit pointer for said each set of said plurality of sets of said cache memory means.

23. An instruction cache apparatus as described in claim 22 wherein said processing means comprises a logical inverter for inverting said bit pointer.

24. An instruction cache apparatus as described in claim 8 wherein said blocking means comprises a logical signal that is coupled to said processing means to functionally disable said processing means upon assertion.

25. An instruction cache apparatus for supplying instructions to a microprocessor, said instruction cache apparatus comprising:

cache memory unit for providing storage of said instructions, said cache memory unit comprising a plurality of sets of storage locations, each set of said plurality of sets comprising a plurality of entries;

a logical pointer table for indicating a particular entry of said plurality of entries for each set of said plurality of sets, said particular entry being a least recently used entry of said plurality of entries for each set of said plurality of sets; and a state machine for updating entries of said logical pointer table, said state machine responsive to a blocking signal and coupled to said logical pointer table, said blocking signal for preventing said state machine from updating said logical pointer table such that said logical pointer table never indicates that instructions within a first portion of said cache memory unit are least recently used when said blocking signal is asserted, said instructions being user selected instructions.

26. An instruction cache apparatus as described in claim 25 further comprising:

an external memory unit for holding a plurality of instructions; and cache logic circuits for storing an instruction into said cache memory unit at a particular set of said plurality of sets, said cache logic circuits for reading said logical pointer table to determine said least recently used entry of said plurality of entries and for storing said instruction into said least recently used entry; and wherein said state machine updates said logical pointer table upon storage of said instruction by said cache logic circuits into a particular set of said cache memory unit.

27. An instruction cache apparatus as described in claim 26 wherein said first portion of said cache memory unit that is blocked by said blocking signal is that portion of said cache memory unit that was most recently used by said cache logic circuits just prior to assertion of said blocking signal.

28. An instruction cache apparatus as described in claim 25 wherein said first portion of said cache memory unit that is blocked by said blocking signal is that portion of said cache memory unit that was most recently used by said microprocessor just prior to assertion of said blocking signal.

29. An instruction cache apparatus as described in claim 25 wherein:

said microprocessor and said cache logic circuits store a particular plurality of instructions into said cache memory unit when said blocking signal is not asserted, said particular plurality of instructions being stored into said first portion of said cache memory unit; and wherein said microprocessor executes an instruction that asserts said blocking signal after said particular plurality of instructions has been stored into said cache unit to insure that said plurality of instructions is subsequently accessible via said cache memory unit.

30. An instruction cache apparatus as described in claim 29 wherein said particular plurality of instructions comprises time critical instructions that must execute within a predetermined timing window.

31. An instruction cache apparatus as described in claim 29 wherein said microprocessor disables said blocking signal when execution time of said plurality of instructions is no longer critical.

32. An instruction cache apparatus as described in claim 25 wherein said cache memory unit comprises a two way set associative memory and said logical pointer table comprises a bit pointer for each set of said plurality of sets of said cache memory unit.

33. An instruction cache apparatus as described in claim 25 wherein said state machine comprises a logical inverter for inverting entries of said logical pointer table and wherein said blocking signal is coupled to said state machine to functionally disable said logical inverter when said blocking signal is asserted.

34. An instruction cache apparatus as described in claim 25 wherein:

said cache memory unit comprises a two way set associative memory;

said logical pointer table comprises a bit pointer for each set of said plurality of sets of said cache memory unit;

said state machine comprises a logical inverter for inverting said bit pointer for said each set of said plurality of sets of said cache memory unit; and wherein said blocking signal is coupled to said state machine and selectively asserted to functionally disable said logical inverter of said state machine.

35. A system comprising:

bus means for providing communication paths within said system; microprocessor means for executing instructions, said microprocessor means coupled to said bus means; external memory means for storing and retrieving said instructions and data, said external memory means coupled to said bus means, signal generation means for generating output signals, said signal generation means coupled to said bus means; and instruction cache means for supplying instructions to said microprocessor means, said instruction cache means communicatively coupled to said bus means, said instruction cache means comprising:

cache memory means for providing storage and retrieval of said instructions, said cache memory means comprising a plurality of sets of storage locations, each set of said plurality of sets comprising a plurality of entries;

pointing means for indicating a particular entry of said plurality of entries for each set of said plurality of sets, said particular entry being a least recently used entry of said plurality of entries for each set of said plurality of sets;

processing means for updating said pointing means, said processing means coupled to said pointing means; and blocking means for preventing said processing means from updating said pointing means such that said pointing means never indicates that selected instructions within a first portion of said cache memory means are least recently used while said blocking means is asserted, said selected instructions being user selected instructions.

36. A system as described in claim 35 further comprising:

storage means for storing an instruction into said cache memory means at a particular set of said plurality of sets, said storage means for reading said pointing means to determine said least recently used entry of said plurality of entries of said particular set and for storing said instruction into said least recently used entry.

37. A system as described in claim 36 wherein said processing means updates said pointing means upon storage of said instruction by said storage means into said particular set of said cache memory means.

38. A system as described in claim 37 wherein said processing means updates said pointing means by ordering each entry of each of said sets according to a last time each said entry was used for instruction storage by said storage means.

39. A system as described in claim 37 wherein said first portion of said cache memory means that is blocked by said blocking means is that portion of said cache memory means that was most recently used for instruction storage by said storage means just prior to assertion of said blocking means.

40. A system as described in claim 35 wherein said processing means updates said pointing means by ordering each entry of said each set according to a last time said each entry was accessed by said microprocessor means.

41. A system as described in claim 35 wherein said first portion of said cache memory means that is blocked by said blocking means is that portion of said cache memory means that was most recently used by said microprocessor means before said blocking means was asserted.

42. A system as described in claim 35 further comprising:

means for storing a particular plurality of instructions into said cache memory means when said blocking means is not asserted, said particular plurality of instructions being loaded into said first portion of said cache memory means; and means for asserting said blocking means after said particular plurality of instructions has been stored.

43. A system as described in claim 42 wherein said microprocessor means executes said particular plurality of instructions when said blocking means is asserted to insure that said plurality of instructions is accessed via said cache memory means and not by said external memory means.

44. A system as described in claim 43 wherein said means for asserting said blocking means disables said blocking means when execution time of said plurality of instructions is no longer critical.

45. A system as described in claim 42 wherein said particular plurality of instructions comprises time critical instructions that must execute within a predetermined timing window.

46. A system as described in claim 42 wherein said means for asserting said blocking means comprises said microprocessor means executing a blocking instruction.

47. A system as described in claim 42 wherein:

said cache memory means comprises a two way set associative memory;

said pointing means comprises a logical pointer table having a bit pointer for each set of said plurality of sets of said cache memory means;

said processing means comprises a logical inverter for inverting said bit pointer for each set of said plurality of sets of said cache memory means;

said blocking means comprises a logical signal that is coupled to said processing means, said logical signal functionally disabling said processing means upon assertion; and said means for asserting said blocking means comprises said microprocessor executing a blocking instruction.

48. A system as described in claim 35 wherein said cache memory means comprises a two way set associative memory.

49. A system as described in claim 35 wherein said pointing means comprises a logical pointer table having a bit pointer for each set of said plurality of sets of said cache memory means.

50. A system as described in claim 49 wherein said processing means comprises a logical inverter for inverting said bit pointers.

51. A system as described in claim 35 wherein said blocking means comprises a logical signal that is coupled to said processing means, said logical signal functionally disabling said processing means upon assertion.

52. A caching method for storing and supplying instructions to a microprocessor, said method comprising the steps of:

providing a cache memory for storage and retrieval of said instructions, said cache memory comprising a plurality of sets of storage locations, each set of said plurality of sets comprising a plurality of entries;

indicating a particular entry of said plurality of entries for each of said sets, said particular entry being a least recently used entry of said plurality of entries for each of said sets, said step of indicating utilizing a logical pointer table;

updating said logical pointer table to reflect access of said entries of said plurality of sets; and preventing said logical pointer table from indicating that user selected instructions within a first portion of said cache memory are least recently used, said step of preventing comprising the step of responding to the assertion of a blocking signal.

53. A caching method as described in claim 52 further comprising the steps of:

storing an instruction into said cache memory at a particular set of said plurality of sets, said step of storing comprising the steps of reading said logical pointer table to determine said least recently used entry of said plurality of entries of said particular set and storing said instruction into said least recently used entry.

54. A caching method as described in claim 53 wherein said step of updating updates said logical pointer table upon storage of said instruction by said step of storing into a particular set of said cache memory.

55. A caching method as described in claim 54 wherein said step of updating updates said pointer table by ordering each entry of each of said sets according to a last time each said entry was used for instruction storage by said step of storing.

56. A caching method as described in claim 54 wherein said first portion of said cache memory that is blocked by said blocking signal is that portion of said cache memory that was most recently used for instruction storage by said step of storing just prior to assertion of said blocking signal.

57. A caching method as described in claim 52 wherein said step of updating updates said logical pointer table by ordering each entry of each of said sets according to a last time each said entry was accessed by said microprocessor.

58. A caching method as described in claim 52 wherein said first portion of said cache memory that is blocked by said blocking signal is that portion of said cache memory that was most recently used by said microprocessor before said blocking signal was asserted.

59. A caching method as described in claim 52 further comprising the steps of:

storing said user selected instructions into said cache memory when said blocking signal is not asserted, said user selected instructions being loaded into said first portion of said cache memory; and asserting said blocking signal after said user selected instructions have been stored by said step of storing.

60. A caching method as described in claim 59 further comprising the step of said microprocessor executing said user selected instructions while said blocking signal is asserted to insure that said user selected instructions are accessed via said cache memory.

61. A caching method as described in claim 60 further comprising the step of disabling said blocking signal when execution time of said user selected instructions is no longer critical.

62. A caching method as described in claim 59 wherein said user selected instructions comprise time critical instructions that must execute within a predetermined timing window.

63. A caching method as described in claim 62 wherein:

said cache memory comprises a two way set associative memory;

said pointer table comprises a bit pointer for each set of said plurality of sets of said cache memory;

said step of updating is implemented using a logical inverter for inverting said bit pointers for each set of said plurality of sets of said cache memory;

said blocking signal functionally disables said logical inverter; and said step of asserting said blocking signal is implemented by said microprocessor executing a blocking instruction when execution time of said user selected instructions is no longer critical.

64. A cache method as described in claim 59 wherein said step of asserting said blocking signal is implemented via said microprocessor executing a blocking instruction.

65. A caching method as described in claim 52 wherein said cache memory comprises a two way set associative memory.

66. A caching method as described in claim 52 wherein said pointer table comprises a bit pointer for said each set of said plurality of sets of said cache memory.

67. A caching method as described in claim 52 wherein said step of updating is implemented using a logical inverter.

* * * * *

UNITED STATES PATENT AND TRADEMARK OFFICE
CERTIFICATE OF CORRECTION

| | | |
|---|---|---|
| PATENT NO. | : | 5,493,667 |
| DATED | : | February 20, 1996 |
| INVENTOR(S) | : | Huck et al. |

It is certified that error appears in the above-identified patent and that said Letters Patent is hereby corrected as shown below:

In column 8 at line 28 delete " "B,[ " and insert --"B,"--

In column 9 at line 53 delete "BCU" and insert --BCL--

In column 21 at line 6 delete "instruction" and insert --instructions--

In column 21 at line 12 delete "indicting" and insert --indicating--

In column 28 at line 27 delete "cache" and insert --caching--

Signed and Sealed this

Tenth Day of September, 1996

Attest:

BRUCE LEHMAN

*Attesting Officer*    Commissioner of Patents and Trademarks